United States Patent
Getto et al.

(10) Patent No.: US 8,342,006 B2
(45) Date of Patent: Jan. 1, 2013

(54) METHOD AND DEVICE FOR DETECTING AND/OR QUANTIFYING WATER LEAKS

(75) Inventors: Daniel Getto, Le Fontanil (FR); Patrick Burghoffer, Chirens (FR)

(73) Assignee: Commissariat a l'Energie Atomique, Paris (FR)

( * ) Notice: Subject to any disclaimer, the term of this patent is extended or adjusted under 35 U.S.C. 154(b) by 549 days.

(21) Appl. No.: 12/518,850

(22) PCT Filed: Nov. 27, 2007

(86) PCT No.: PCT/FR2007/001942
§ 371 (c)(1),
(2), (4) Date: Oct. 21, 2009

(87) PCT Pub. No.: WO2008/081089
PCT Pub. Date: Jul. 10, 2008

(65) Prior Publication Data
US 2010/0064776 A1    Mar. 18, 2010

(30) Foreign Application Priority Data
Dec. 12, 2006   (FR) ...................... 06 10800

(51) Int. Cl.
*G01M 3/04* (2006.01)
(52) U.S. Cl. ............... 73/40; 73/40 R; 73/49.1; 73/49.5; 73/861.05
(58) Field of Classification Search ............... 73/40.5 R, 73/40.7, 49.1, 861
See application file for complete search history.

(56) References Cited

U.S. PATENT DOCUMENTS

| 1,616,481 A |   | 2/1927 | Allen |   |
|---|---|---|---|---|
| 3,695,094 A | * | 10/1972 | Hulme | ........................ 73/40.5 R |
| 4,407,158 A |   | 10/1983 | Petroff |   |
| 4,448,082 A | * | 5/1984 | Barriol et al. | ............... 73/861.05 |
| 4,969,363 A | * | 11/1990 | Mochizuki | ................. 73/861.17 |

(Continued)

FOREIGN PATENT DOCUMENTS

| FR | 2 491 618 | 4/1982 |
|---|---|---|
| FR | 2 860 588 | 4/2005 |
| GB | 2 318 643 | 4/1998 |

OTHER PUBLICATIONS

John et al. "A Conductivity Flow Meter", Journal of Hydraulic Research, 14:1, 1976, pp. 37-44.
Smart "On-Line Velocity Measurement by Salt Conductivity", Hydrosoft '84 Hydraulic Engineering Software 1984, 1-155-1-161.
Allen et al. "The Salt Velocity Method of Water Measurement", Transactions of the American Society of Mechanical Engineers, 1923, 285-341.

*Primary Examiner* — Hezron E Williams
*Assistant Examiner* — Hoang Nguyen
(74) *Attorney, Agent, or Firm* — Morgan, Lewis, Bockius LLP

(57) ABSTRACT

The invention relates to a method for detecting and/or quantifying water leaks in a water pipe, and to a device for realizing said method. The method of the invention comprises measuring the water flow rate in the pipe in at least two different locations, i.e., one downstream and one upstream relative to the suspected leak, the water flow rate being measured by injecting a tracing agent that modifies the water conductivity instantaneously at an upstream location and a downstream location relative to the suspected leak location, continuously measuring the water conductivity downstream from said locations and, from the conductivity values, calculating the water flow rates upstream and downstream relative to the suspected leak location in the pipe. The method of the invention can be used for quantifying a leak flow rate that can even be a very small one.

14 Claims, 4 Drawing Sheets

U.S. PATENT DOCUMENTS

| | | | |
|---|---|---|---|
| 5,247,836 A * | 9/1993 | Lew et al. | 73/861.08 |
| 6,314,795 B1 * | 11/2001 | Ingham | 73/49.1 |
| 6,393,925 B1 * | 5/2002 | Devlin | 73/861.05 |
| 7,007,545 B1 | 3/2006 | Martinek | |
| 7,279,903 B2 * | 10/2007 | Quackenbush et al. | 324/445 |
| 7,854,175 B2 * | 12/2010 | Weilguny et al. | 73/861.09 |
| 7,861,601 B2 * | 1/2011 | Sale et al. | 73/861.07 |

* cited by examiner

METHOD AND DEVICE FOR DETECTING AND/OR QUANTIFYING WATER LEAKS

CROSS-REFERENCE TO RELATED APPLICATIONS

The present application is a U.S. National Phase Application of International Application PCT/FR2007/001942, filed on Nov. 27, 2007, which claims the benefit of French Application No. 0610800, filed on Dec. 12, 2006, all of which are herein incorporated by reference in their entirety.

The invention relates to a method for detecting and/or quantifying water leaks in a water pipe and to a device for implementing this method.

Water has become a highly monitored and increasingly precious commodity for most countries throughout the world. The distribution of drinking water is therefore given the fullest of attention. According to various investigations conducted both in France and abroad, there is everything to suggest that a not insignificant amount of the water distributed is lost through leaks in the distribution network.

For example, according to an investigation conducted in Canada in 1991 by the International Water Supply Association (AIDE), the amount of water lost or "unaccounted for" represents between 20 and 30% of the total production.

Likewise, the French Environment Agency (IFEN) has estimated that of the approximately six billion cubic meters of water distributed in France in 2001, the subscribers were invoiced for only three-quarters of these volumes, the remainder consisting, to a small extent (3%) of uninvoiced volumes but mainly, of the order of 24%, of leaks from the network. These leaks are caused mainly by corrosion, materials defects, defective installations, earth movements, vibrations or excessive loading caused in particular by traffic, the absence or shortcomings of maintenance, etc.

Aside from the economic loss caused by the lost revenue to the distributors, there are also other problems such as, for example, risks to public health as contaminants enter the water distribution network at the site of the leaks.

Economic pressures, the threat to public health and the need to save water are driving water network operators to set in place programs for detecting and quantifying leaks in order to eliminate them.

Substantial leaks in a network are usually revealed by automatic monitoring of flow rates which makes it possible to detect an unaccustomed increase in water consumption on a clearly determined sector. The leak can then be located using various methods, the most widespread of which involve the use of ultrasound or acoustic signals, but also using non-acoustic techniques namely the use of tracer gas, georadars or, alternatively, infrared imaging.

While these methods do appear to be satisfactory for administrations as far as relatively substantial leaks are concerned, high measurement sensitivity is required to detect and locate smaller leaks which are also more "latent".

According to a recent study conducted by the Canadian National Research Council, the problems which usually hamper the use of acoustic instruments for locating leaks, for example interference caused by the noise of traffic and the weakening of the signals along the pipelines, are accentuated in the case of plastic pipes, thus causing most operators to doubt the effectiveness of the acoustic detection equipment. This is a rather thorny issue, because the use of plastic piping is becoming more widespread in water networks throughout the world.

There is therefore a difficulty in detecting and locating water leaks on a drinking water network using the various known methods and without being able to quantify a leakage flow rate, however low it might be.

It is an objective of the invention to alleviate the disadvantages of the detection methods of the prior art which are due, in particular, to the use of plastic pipes and above all to allow even a very small leakage flow rate to be quantified.

To this end, the invention proposes a method for detecting and/or for quantifying a water leak on a water pipe, of the type that consists in measuring the flow rate of the water flowing through the pipe at least two distinct points of this pipe, one downstream and the other upstream of the presumed leak point.

In the method of the invention, the water flow rate is measured by measuring the conductivity of the water.

To do that, in the method of the invention, a tracer that modifies the conductivity of the water is injected temporarily upstream and downstream of the presumed water leak point.

The conductivity of the water, from the time $t1$ of injection of the tracer until the time $t2$ when the conductivity of the water returns to its initial value, is then measured.

The tracer adopted for the conductivity measurements has first of all to be a good tracer of the water, that is to say to reflect faithfully the movements of the water. In the special case of drinking water, the tracer has to exhibit zero toxicity or a toxicity that is acceptable to the water distributors. This is why, in the invention, the preferred tracer is sodium hypochlorite, NaOCl (bleach) which is already very much in use in drinking water for correct water treatment and which will be detected using a conductivity meter measurement. Other tracers such as $Cl_2$ (already used for drinking water purification purposes and which is therefore non-toxic within the context of this application) are also conceivable.

The conductivity is measured using a device that comprises two electrodes, the device being placed in the pipe through which the water flows, and by applying an alternating current between the two electrodes, this having the effect of causing each of the ions to migrate toward an electrode according to the electric charge thereof, and of generating a current.

The resistivity R and conductivity C of the solution can be determined from the measurement of current strength, using the relationship $C=1/R$. The conductivity therefore characterizes the ability of the solution to conduct current and is directly proportional to the concentration of ions present in the volume delimited by the measurement cell.

Thus, in the method of the invention, the tracer is injected temporarily at a point $I1$ upstream of the water leak and at a point $I2$ downstream of the water leak, and conductivity is measured continuously at each of these two observation points in order to monitor the tracer passing function.

Following numerical processing and calculation in accordance with the Allen method described in "Théorie de la méthode d'Allen et ses consequences pratiques pour la mesure des débits en conduite [The theory of the Allen method and its practical applications in the measurement of flows in pipes]", by J. Guizerix and R. Margrita, published in la Houille Blanche No 3/4-1976, p 291-296, the difference in the order-1 moments of the conductivity change curves obtained makes it possible to calculate the mean velocity of the water and, with knowledge of the cross-sectional area of the pipe, it is possible directly to determine the flow rate passing through the pipe at the conductivity measurement cells.

This type of measurements can be repeated at a number of points in the network and thus, through successive differences, can reveal any difference in flow rate there might be which would indicate a leak in the water pipe between the two points considered.

This technique has the advantage that the leak flow rate can be quantified and the leak located between the two measurement points. An acoustic method can then be used in order to pinpoint the leak.

More specifically, the conductivity of the flowing water is measured upstream and downstream of the presumed leak by positioning in the pipe, upstream and downstream of the presumed leak point, a conductivity measurement cell, each cell being made up of two conductivity measuring devices and of a tracer injection point. It will be noted that the distance between two cells has no particular impact on either the detection or quantification of the leak.

Each measuring device is made up of two electrodes, of which one forms the body of the device, this body allowing the water to pass, the other electrode of which being connected to, but electrically insulated from, the first electrode (the body of the device) and projecting directly into the stream of flowing water.

As a preference, the electrodes are made of stainless steel.

Each device is fitted with flanges for connecting to each end of the water pipe.

BRIEF DESCRIPTION OF THE FIGURES

The invention will be better understood and further features and advantages thereof will become more clearly apparent in the light of the explanatory description and of the exemplary embodiments which follow, and which are given with reference to the figures in which.

Figure 1:
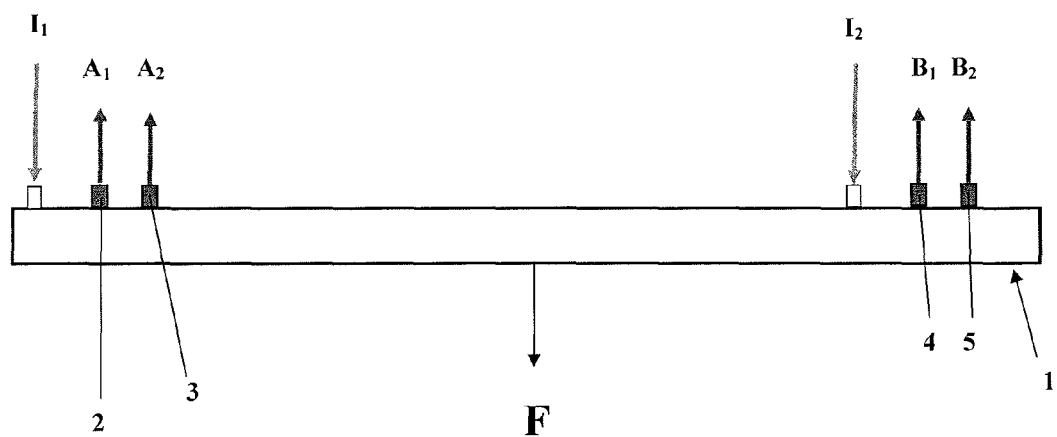
FIG. 1 schematically depicts the principle behind the detection of a leak in a pipe according to the invention.

The principle behind detecting a water leak in a water pipe according to the invention is illustrated schematically in FIG. 1.

Figure 4:
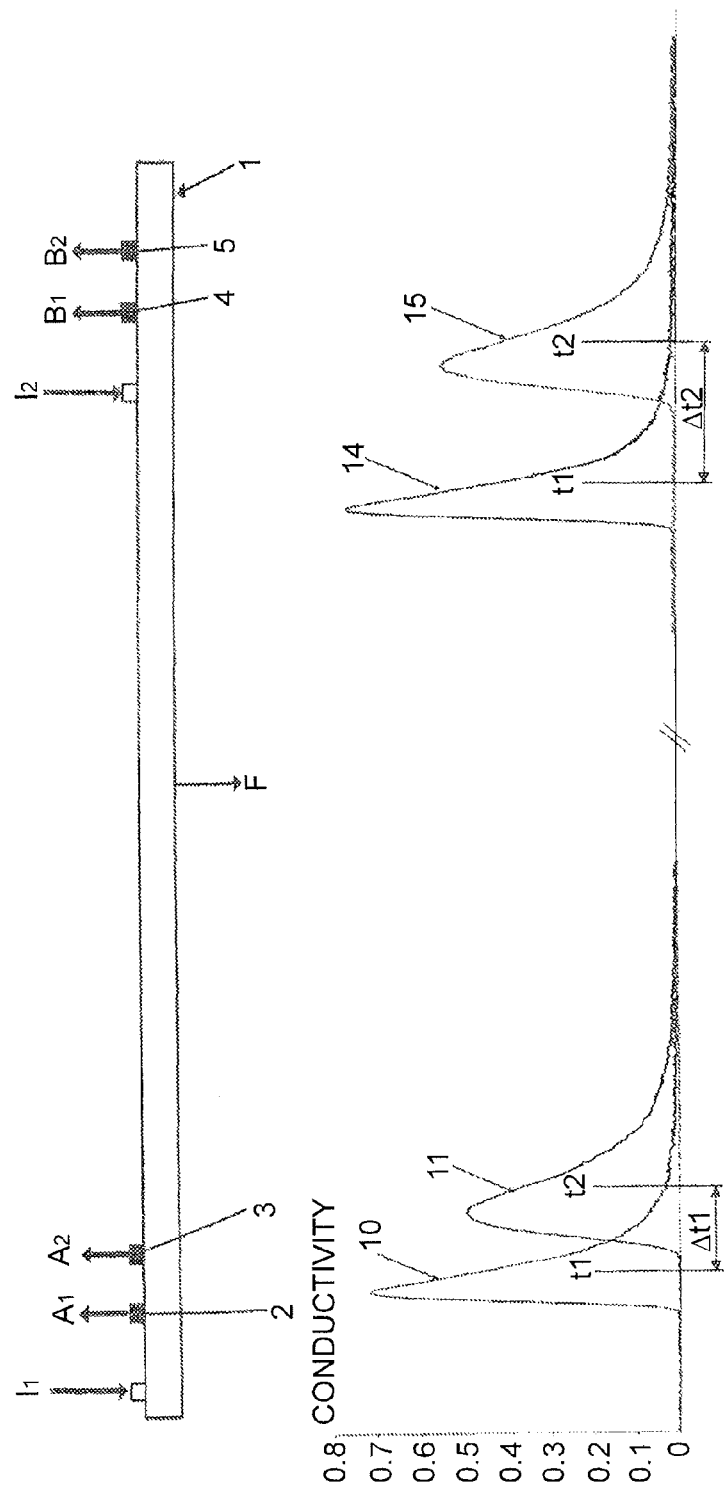
FIG. 4 depicts the conductivity curves obtained at a conductivity measurement cell, in one particular embodiment of the invention.

The method of the invention therefore consists in temporarily injecting, at a point denoted I1 in FIGS. 1 and 4, situated upstream of the presumed leak point, denoted F in FIGS. 1 and 4, and at a point denoted I2 in FIGS. 1 and 4, situated downstream of the presumed leak point F, a tracer that modifies the conductivity of the water.

The conductivity of the water flowing through the pipe, denoted 1 in FIGS. 1 and 4, is then continuously measured, from the moment t1 of injection until the moment t2 of return to the initial conductivity value, between the points denoted A1 and A2 in FIGS. 1 and 4, on the one hand, and, on the other hand, between the points denoted B1 and B2 in FIGS. 1 and 4.

The conductivity is measured by positioning, at each of the points A1, A2 and B1, B2, conductivity measuring devices respectively denoted 2, 3 and 4, 5 in FIGS. 1 and 4.

As can be seen in FIGS. 1 and 4, the conductivity measuring device 2 is situated downstream of the injection point I1 but upstream of the conductivity measuring device 3, the devices 2 and 3 being situated upstream of the presumed leak point F, and the conductivity measuring device 4 is situated downstream of the injection point I2 and upstream of the point B2 at which the conductivity measuring device 5 is positioned.

From the conductivity curves obtained at points A1, A2 and B1, B2, the flow rate Q1 of water flowing through the pipe 1 upstream of the presumed leak point F and the flow rate Q2 of water flowing through the pipe 1 downstream of the presumed leak point F are calculated using the Allen method. If a difference between the flow rates Q1 and Q2 is observed, that means that there is a water leak between the points I1 and I2. In addition, the flow rate of this leak is quantified.

Figure 2:
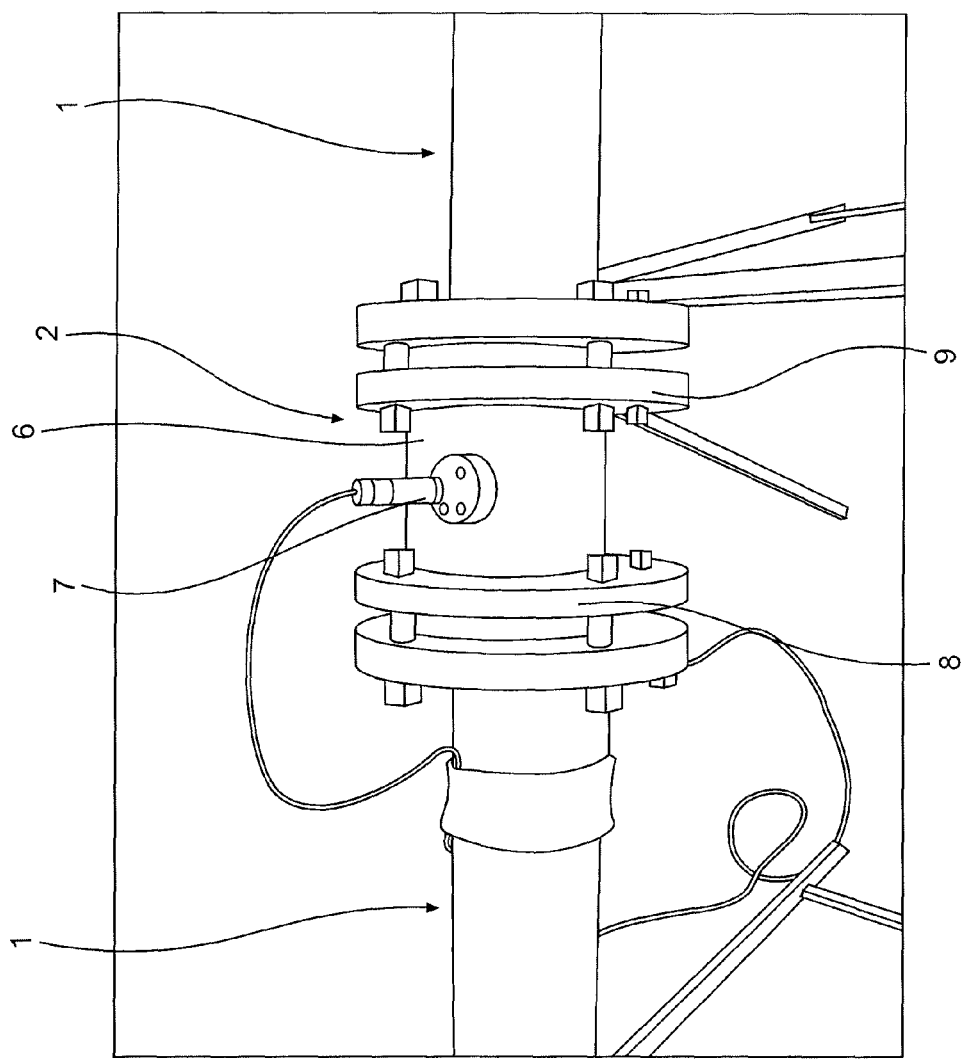
FIG. 2 depicts a photograph of a conductivity measurement device according to the invention, connected to a water distribution pipe, FIG. 3 schematically depicts the conductivity measurement device according to the invention, depicted in FIG. 2.

A photograph of a conductivity measuring device in situ in the pipe 1 is shown in FIG. 2.

As can be seen from FIG. 2, in which the conductivity measuring device of the invention is denoted 2, the device of the invention consists of a hollow body 6 positioned in the pipe 1 and allowing water to pass through the pipe 1 and the body of the device 6.

The conductivity measuring device 2 is connected to each end of the pipe 1 by flanges denoted 8 and 9 in FIG. 2.

Projecting into the hollow body 6 of the device 2 is an electrode denoted 7 in FIG. 2.

Figure 3:
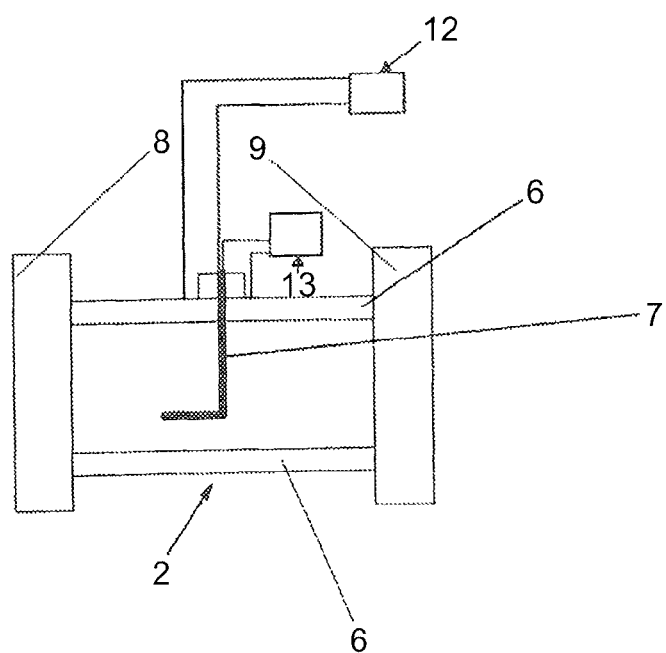

The structure of the conductivity measuring device according to the invention is more specifically shown in a schematic form in FIG. 3.

As can be seen in FIG. 3, the conductivity measuring device 2 according to the invention consists of a hollow body 6 forming a first electrode and through which water from the pipe 1 (not shown) to which this hollow body 6 is connected by the flanges 8 and 9 flows.

A second electrode 7, electrically insulated from the hollow body 6 but connected thereto, is positioned in such a way as to project into the stream of water flowing through the hollow body 6.

As a preference, the hollow body, that is to say the electrode 6, and the electrode 7, are made of stainless steel.

Of course, the electrodes 6 and 7 are connected, on the one hand, to means, noted 12 in FIG. 3, for applying alternative current to the electrodes, and, on the other hand, means, noted 13 in FIG. 3, receiving the electrical response of these electrodes and converting it into conductance.

A number of exemplary embodiments of the method of the invention will now be described by way of purely illustrative and nonlimiting example.

In particular, the distances between measurement points, between the injection point and the measurement cell can easily be adapted by those skilled in the art. Thus, the distance between the injection point and the first measurement point needs to be sufficient that the tracer is suitably homogeneous in the section when this tracer reaches the measurement point. This distance, known as the "good mixing distance", roughly follows the general rule: in general, it needs to be 50 times the diameter of the pipe.

Example 1

This example will be described with reference to FIGS. 1 and 4.

Tests were carried out on a pipe 1 with a diameter of 53 mm in which the water flow rate was 1000 l/h.

Four conductivity measuring devices 2, 3, 4, 5 were placed in this pipe 1.

In this example, the devices 2 and 3 are spaced 3.8 m apart and the devices 4 and 5 are spaced 3.8 m apart.

The devices 3 and 4 are spaced 10 m apart from the presumed leak point F. The hollow body 6 has a diameter of 53 mm and a volume of 220 cm$^3$.

The hollow body of which the electrode 6 was formed and the electrode 7 are made of stainless steel.

1 ml of sodium hypochlorite (bleach containing 10% active chlorine) is injected temporarily at the time t1 at the injection points I1 and I2. The injection point I1 is situated 2 meters upstream of the device 2 and the injection point I2 was 2 meters away from the device 4.

From the injection time t1 to the time t2 at which the conductivity of the water returned to its initial value, the change in conductivity is recorded in the form of curves at the points A1, A2 and B1, B2.

The conductivity curves obtained at the measurement points A1 to A2 are depicted in FIG. 4 in which the curve recorded at point A1 is denoted 10 and the curve recorded at point A2 is denoted 11. From these curves and from the curves obtained at points B1 and B2, denoted 14 and 15 respectively, in FIG. 4, the flow rates Q1 and Q2 upstream and downstream of the leak F were calculated.

Each flow rate Q1 and Q2 is obtained using the formula $Q=V/\Delta t$ where V represents the volume of the section between the two cells and $\Delta t$ represents the distance between the mean time of the first curve and the mean time of the second curve. The mean time of each of the curves is obtained using the centroid of the curve. This data is readily accessible through the mathematical processing of a curve. It might also be possible to conceive of using the mean time corresponding to the top of the curve, which value may coincide with the centroid of the curve in the event of a perfect Gaussian distribution. Other mathematical curve processing operations are conceivable, for example the deconvolution method. All these methods are known to those skilled in the art.

The calculated leak values are listed in table 1 below.

TABLE 1

| Leak flow rate (l/h) % of nominal flow rate | Nominal flow rate (l/h) 947.46 | Test 1 | Test 2 | Test 3 |
|---|---|---|---|---|
| 93.0 l/h | Measured flow rate (l/h) | 851.09 | 850.23 | 854.84 |
| 9.8% | Calculated leak (l/h) | 96.37 | 97.23 | 62.62 |
| | Difference % | 3.62 | 4.55 | −0.41 |
| 72.6 l/h | Measured flow rate (l/h) | 870.12 | 870.89 | 862.65 |
| 7.7% | Calculated leak (l/h) | 77.34 | 76.57 | 84.81 |
| | Difference % | 6.53 | 5.47 | 16.82 |
| 52.2 l/h | Measured flow rate (l/h) | 887.39 | 885.80 | 890.45 |
| 5.5% | Calculated leak (l/h) | 60.07 | 61.66 | 57.01 |
| | Difference % | 15.08 | 18.12 | 9.21 |

Example 2

The same tests as in example 1 were performed, except that the flow rate of the water flowing through the pipe 1 was 2500 l/h.

The calculated leak values are listed in table 2 below.

TABLE 2

| Leak flow rate (l/h) % of nominal flow rate | Nominal flow rate (l/h) 2443.50 | Test 1 | Test 2 | Test 3 |
|---|---|---|---|---|
| 133 l/h | Measured flow rate (l/h) | 2305.41 | 2304.62 | 2307.47 |
| 5.4% | Calculated leak (l/h) | 138.09 | 138.88 | 136.03 |
| | Difference % | 3.21 | 3.80 | 1.67 |
| 98.4 l/h | Measured flow rate (l/h) | 2351.94 | 2350.08 | 2357.02 |
| 4.0% | Calculated leak (l/h) | 91.56 | 93.42 | 86.48 |
| | Difference % | −6.95 | −5.06 | −12.11 |
| 59.4 l/h | Measured flow rate (l/h) | 2379.25 | 2379.95 | 2379.50 |
| 2.4% | Calculated leak (l/h) | 64.25 | 63.55 | 64.00 |
| | Difference % | 8.16 | 6.99 | 7.74 |

Thus, it can be seen from the distance Q1-Q2 that, using the method of the invention, small leakage flow rates can be detected and quantified, these small leakage flow rates corresponding to leaks of 5 to 10% of the nominal flow rate. In addition, it has been found that the difference between the values measured using the Allen method and the actual leakage values is generally less than 5% and of the order of 15% for very small flow rates. It will also be noted that the higher the flow rate, the better the sensitivity.

The same tests were carried out on a pipe with a diameter of 100 mm. The results obtained were the same.

The method of the invention can be applied to all drinking water networks but also to other types of flow in pipes for which there is no reliable means of measuring leaks, however small these might be.

The invention claimed is:

1. A method for detecting and/or for quantifying a water leak (F) on a drinking water pipe (1), of the type that consists in measuring the flow rate of the water flowing through the pipe (1) at least at two distinct points, one downstream of the presumed leak point F, and the other upstream of the presumed leak point F, comprising:
    measuring the water flow rate by temporarily injecting, at a point I1 upstream of the presumed leak point F and at a point I2 downstream of the presumed leak point F, a tracer that modifies the conductivity of the water;
    measuring the conductivity of the water continuously downstream of each of the points I1 and I2 for a period beginning at the time t1 of the injection until the time t2 at which the conductivity of the water returns to the value it had prior to the injection of the tracer; and
    calculating from these values the flow rates Q1 and Q2 of water flowing upstream and downstream of the presumed leak point F in the pipe (1) thereby detecting and/or quantifying a water leak.

2. The method as claimed in claim 1, wherein the tracer is a bleach.

3. The method as claimed in claim 1, wherein the flow rate Q1 and the flow rate Q2 are measured by:
    a) positioning at least four water conductivity measuring devices (2, 3, 4, 5), each device comprising two electrically insulated electrodes (6, 7), of which one (6) constitutes the body of the cell and the other (7) is in a central position directly in the stream of water flowing through the pipe (1), the body of the device consisting of the electrode (6) allowing the water to pass; and
    b) applying an alternating current between the two electrodes (6) and (7), the first device (2) being situated in the pipe at a point A1 downstream of the injection point I1 and upstream of the presumed leak point F, the second measuring device (3) being situated at a point A2 downstream of the point A1 and upstream of the presumed leak point F, the third device (4) being situated at a point B1 situated downstream of the injection point I2, and the fourth device (5) being situated at a point B2 downstream of the point B1.

4. The method as claimed in claim 3, wherein the electrodes (6, 7) of each device (2, 3, 4, 5) are made of stainless steel.

5. A measuring device (2) for measuring the conductivity of water in order to implement the method as claimed in claim 1, comprising:
    a hollow body (6) which constitutes a first electrode, of which the diameter is preferably equal to the diameter of the pipe (1);

a second electrode (7) connected to the hollow body (6), but electrically insulated therefrom, and centered in the hollow body (6); and two fixing flanges (8, 9) for fixing each end of the hollow body (6) respectively to an end of the pipe (1).

6. The measuring device (2) as claimed in claim 5, wherein the electrodes (6, 7) are made of stainless steel.

7. The method as claimed in claim 2, wherein the flow rate Q1 and the flow rate Q2 are measured by:
 a) positioning at least four water conductivity measuring devices (2, 3, 4, 5), each device comprising two electrically insulated electrodes (6, 7), of which one (6) constitutes the body of the cell and the other (7) is in a central position directly in the stream of water flowing through the pipe (1), the body of the device consisting of the electrode (6) allowing the water to pass; and
 b) applying an alternating current between the two electrodes (6) and (7), the first device (2) being situated in the pipe at a point A1 downstream of the injection point I1 and upstream of the presumed leak point F, the second measuring device (3) being situated at a point A2 downstream of the point A1 and upstream of the presumed leak point F, the third device (4) being situated at a point B1 situated downstream of the injection point I2, and the fourth device (5) being situated at a point B2 downstream of the point B1.

8. A measuring device (2) for measuring the conductivity of water in order to implement the method as claimed in claim 2, comprising:
 a hollow body (6) which constitutes a first electrode, of which the diameter is preferably equal to the diameter of the pipe (1);
 a second electrode (7) connected to the hollow body (6), but electrically insulated therefrom, and centered in the hollow body (6); and
 two fixing flanges (8, 9) for fixing each end of the hollow body (6) respectively to an end of the pipe (1).

9. A measuring device (2) for measuring the conductivity of water in order to implement the method as claimed in claim 3, comprising:
 a hollow body (6) which constitutes a first electrode, of which the diameter is preferably equal to the diameter of the pipe (1);
 a second electrode (7) connected to the hollow body (6), but electrically insulated therefrom, and centered in the hollow body (6); and
 two fixing flanges (8, 9) for fixing each end of the hollow body (6) respectively to an end of the pipe (1).

10. A measuring device (2) for measuring the conductivity of water in order to implement the method as claimed in claim 4, comprising:
 a hollow body (6) which constitutes a first electrode, of which the diameter is preferably equal to the diameter of the pipe (1);
 a second electrode (7) connected to the hollow body (6), but electrically insulated therefrom, and centered in the hollow body (6); and
 two fixing flanges (8, 9) for fixing each end of the hollow body (6) respectively to an end of the pipe (1).

11. The measuring device (2) as claimed in claim 8, wherein the electrodes (6, 7) are made of stainless steel.

12. The measuring device (2) as claimed in claim 9, wherein the electrodes (6, 7) are made of stainless steel.

13. The measuring device (2) as claimed in claim 10, wherein the electrodes (6, 7) are made of stainless steel.

14. The method as claimed in claim 2, wherein the bleach is NaOCl.

* * * * *